Nov. 29, 1938.     C. E. HEITMAN, JR     2,138,790
SPOT WELD RECORDER
Filed Aug. 5, 1935
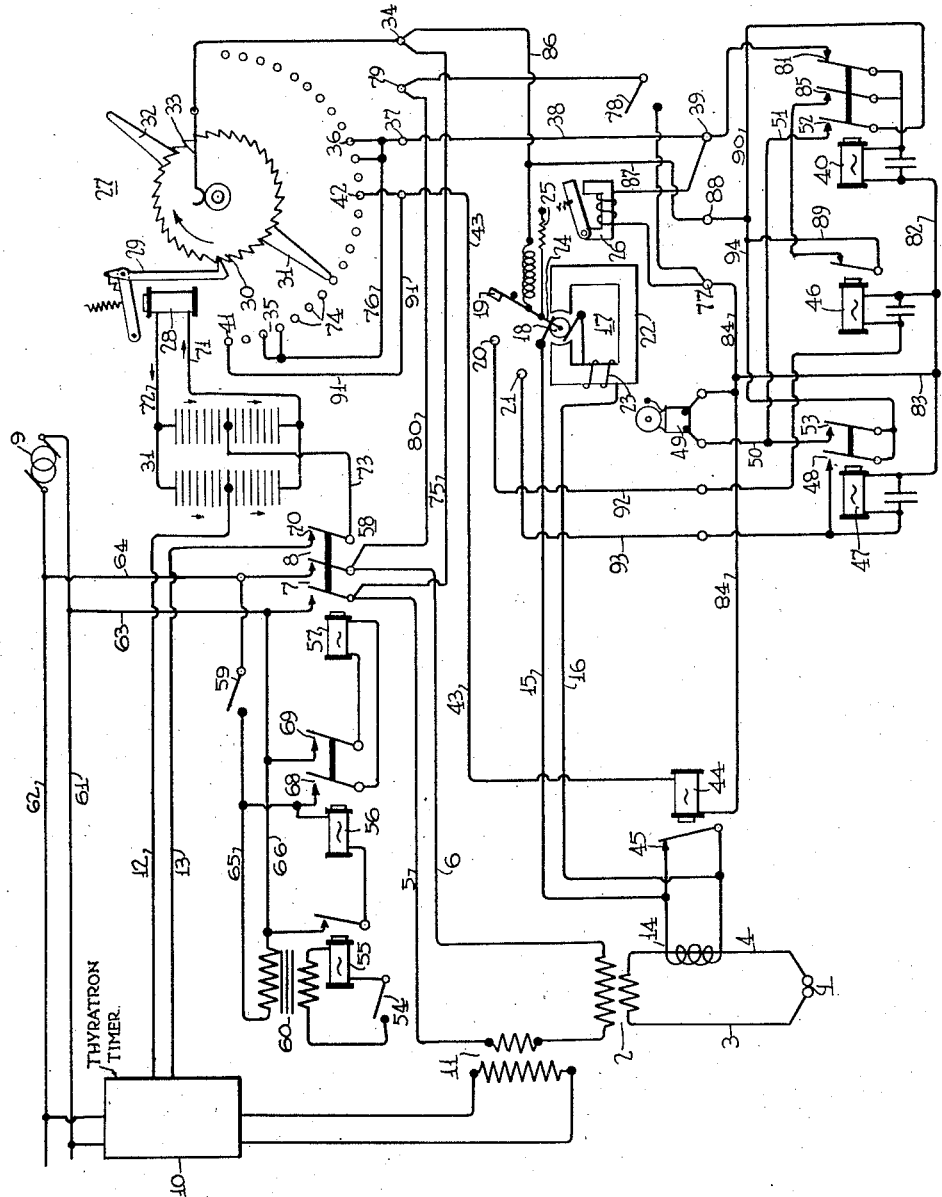
INVENTOR.
CHARLES E. HEITMAN, JR.
BY John P. Tarbox
ATTORNEY.

Patented Nov. 29, 1938

2,138,790

UNITED STATES PATENT OFFICE 2,138,790

SPOT WELD RECORDER

Charles E. Heitman, Jr., Philadelphia, Pa., assignor to Edward G. Budd Manufacturing Company, Philadelphia, Pa., a corporation of Pennsylvania Application August 5, 1935, Serial No. 34,760

15 Claims. (Cl. 177—311)

The present invention relates in general to electrical resistance welding and more particularly to high speed spot welding.

In the copending application of Earl J. W. Ragsdale and Charles E. Heitman, Jr., Serial No. 621,318, filed July 7, 1932, is disclosed in apparatus for indicating and recording the welding heat units consumed in a weld contemporaneously with the flow of current effecting the weld, particularly a spot weld or other weld of short duration, even though the welding operation is shorter than the full response of the recording apparatus. However, such apparatus in itself is inapplicable to systems where the welding current impulses or undulations for the individual welds occur in such rapid succession that the interval between impulses is insufficient to give the indicator time to return to normal position.

This is particularly the case where spot welds are made in rapid succession as in the forming of a series of spot welds by an automatic machine either as relatively widely spaced welds, or closely spaced or overlapping welds as in a seam welder, in which latter the welding current impulses may be either entirely discrete, or may be in the form of undulations similar in effect to impulses overlapping in point of time.

It is therefore the chief object of the present invention to provide in such a high speed system, a means and method of indicating and/or recording certain characteristics of the welding current impulses such as the welding heat units used in an individual weld, regardless of whether the interval between welding operations is less than the full response period of the measuring means, and to do this concurrently with the welding operations so that the operator will be apprised immediately of the occurrence of a faulty operation and may remedy the fault before further progressing with the work.

Other objects and advantages of the invention will be apparent from a perusal of the following specification and the drawing accompanying the same.

I attain the main object of my invention by providing suitable means for measuring the desired characteristics, for example, means for integrating the total welding heat units in a welding current impulse, with means for repeatedly effecting an operative connection of the measuring means with the welding circuit each time for a period so timed with respect to the welding current impulses as to include only one impulse, and at intervals of a sufficient length of time with respect to the time constants of the measuring means to permit the measuring means to assume normal position between such repeated connections.

The invention is illustrated diagrammatically in the accompanying drawing.

While the invention is here shown as used in connection with a timer of the "Thyratron" type, it is to be understood that a particular type of timer is not essential, and that the invention may be used with any type of timer including the various kinds of mechanical timers.

Referring to the diagram in detail, the welding electrodes 1 are supplied with current from the secondary of the welding transformer 2, over leads 3—4, the primary of the welding transformer being connected over leads 5—6 through switch contacts 7—8 to a source of alternating current power supply 9. Timing of the current flow through the primary winding of the welding transformer 2 is effected through the use of a "Thyratron" timer 10 operative to repeatedly close and open the circuit of the secondary winding of a series transformer 11 whose primary winding is connected in series with the welding transformer supply circuit 5—6 to vary the impedance thereof to the extent of cutting on and substantially completely cutting off the current supply to produce the desired welding current impulses, for example, impulses of 4 cycles on with no current or substantially no current intervals of 3 cycles, when the electrodes 1 are those of a seam welding machine or the like. The "Thyratron" timer 10 is also arranged in any known or other suitable manner to supply impulses of alternating current of relatively low voltage, conveniently derived from the source 9, over the circuit 12—13 in synchronism and contemporaneous with the welding current impulses for a purpose to be hereinafter described. The above explanation of the timer will suffice for a clear understanding of the invention inasmuch as the timer 10 with its coupling transformer 11 may be replaced by any known or other suitable form of timer capable of effecting a periodic closing and opening of the primary circuit of the welding transformer or variation of impedance thereof, while supplying synchronous control current impulses over the leads 12—13.

Electrical energy proportional to the current flowing through the leads 3—4 is taken off through a series transformer 14 and led through conductors 15—16 to an energy indicating and recording meter 17. This indicating device is of the type shown and described in the copending application above mentioned and comprises in general a series-type motor relay having a spring biased rotor 18 carrying a contact member 19 and suitable recording stylus not shown, the contact member being arranged to sweep over a pair of signal control contacts 20 and 21 in succession. The stator 22 is provided with a series winding 23 connected in series with the winding of the rotor 18 and the secondary of the series transformer 14 through conductors 15—16. The rotor arm 24 through which the rotor carries the contact 19 is biased in the position indicated by a suitable biasing or retractile spring 25. A recording tape with which the recording stylus cooperates and means for feeding the tape preferably as shown and described in the above-mentioned copending application are not shown here inasmuch as they do not form an essential part of the present invention and may be of any known or other suitable form operable to provide a continuous record of the different meter readings. However, where such a recording tape or the like is used it is desirable that it be moved once for each actuation of the metering device and at a time when the stylus is not in motion and to this end suitable electromagnetic tape moving means is provided and arranged to be operated in timed relation to the operation of the metering device. It therefore suffices simply to indicate such an electromagnetic, tape moving means diagrammatically as an electromagnet 26 in order to show its circuit connections and the timing of its operation in relation to the operation of the system.

Due to the series connection of stator and rotor, the mass inertia of the moving parts and the properly adjusted tension of the retractile spring 25, the throw of the rotor arm 24 is proportional to the square of the current multiplied by time, and as this current is proportional to the welding current, the throw of the arm 24 constitutes a comparative heat units indicator responsive to the current in the welding circuit and the duration thereof. The stationary contact 20 is placed at a point in the path of movable contact 19 representing a predetermined standard of weld perfection while the contact 21 is placed further on in the path of contact 19 at a point representing a total consumption of energy sufficiently great to cause a burn or overheating of te metal at te weld. Preferably te contact 21 is placed at a point up to which the position of the movable contact 19 would represent a weld within the margin of standard quality.

Inasmuch as the meter 17 must integrate the complete current-time value of an entire welding-current impulse its period of complete response must be sufficient to cover the entire period of the welding-current impulse, and as these impulses occur in rapid succession with intervals less than the impulse periods, the meter 17 and associated circuits and apparatus elements will not respond to successive welding-current impulses in a manner to give accurate readings. To make possible an accurate response of the meter 17 regardless of relatively high periodicity of the welding-current impulses and relatively short intervals between impulses, means are provided for repeatedly effecting an operative connection of the meter 17 with the welding circuit each time for a period so timed in relation to the welding current impulses as to include only one complete impulse and at intervals longer than that between such impulses and of sufficient length of time to permit the meter 17 and its associated circuits and apparatus elements to assume normal conditions between such repeated connections. The means for accomplishing this comprises a step-by-step commutating switch 27 operated in synchronism with the welding-current impulses by the synchronized impulses of alternating current supplied by the timer over conductors 12—13. The switch is operated by a direct-current stepping magnet 28, the spring retracted armature of which carries a stepping pawl 29 arranged to operatively engage the driving ratchet 30 of the switch 27. The impulses of alternating current are fed to the stepping magnet 28 through a suitable rectifier assemblage 31 and effect one operation of the magnet at each impulse. In order that the stepping of the switch will occur only during the intervals between welding current impulses the pawl and ratchet are arranged to operate on the back stroke as indicated in the diagram.

The ratchet element 30 carries a pair of diametrically arranged radial wiper arms 31—32 which sweep over a series of fixed contacts so arranged in a semi-circular bank that as one wiper arm leaves the last contact in the bank, the opposite arm will engage the first contact in the bank. Electrical connection with the wiper arms is maintained through brush 33 permanently connected to binding post terminal 34. Certain selected contacts of the bank of fixed contacts or groups of such contacts, suitably spaced in the semi-circular bank such as the groups 35 and 36 are connected in common to the terminal 37 which connects over lead 38 to terminal 39 from which the connection branches to the record-tape feeding magnet 26 and to a normally closed contact on the under-weld signaling relay 40. Contacts 41 and 42 spaced slightly beyond the contact groups 35 and 36 preferably spaced from the latter by at least one dead contact are connected in common through conductor 43 to control relay 44 for maintaining the latter energized during a selected welding-current impulse which relay controls a shunt across the terminals of the series transformer 14 through a normally closed or back contact 45 whereby during the dwell of one of the wiper arms on a contact 41 or 42, the output of the transformer will be directed through the meter 17.

The under-weld signal relay 40 is arranged to lock itself up through a release relay 46 controlled through normal-weld contact 20 of the meter 17 for release of the relay 40 upon arrival of the meter contact 19 at the contact 20, while over-weld signaling relay 47 is arranged to be energized through over-weld contact 21 and lock itself through a front contact 48. A suitable signal such as the audible signal indicated at 49, such as an electric bell is connected over conductors 50 and 51 to front contacts 52 and 53 on under-weld relay 40 and over-weld relay 47, respectively, for control in common thereby.

The system as a whole is controlled through a control switch 54 in a relatively low voltage control circuit which through suitable step up relays 55 and 56 controls the actuating magnet 57 of an electromagnetically operated power supply switch 58. Whereas in the present instance a timer of the "Thyratron" type is used, a high voltage exists in the timer circuits due to the high ratio between the secondary winding of the series transformer 11 and its primary winding in the power circuit, and to guard the operator against contact with such high voltage that portion of the circuit in which it exists is, in practice, housed within the cabinet of the timer 10, and the door of the cabinet arranged to control a safety door switch 59 operable to prevent closure of the control circuit while the cabinet door is open.

In operation, assuming that the safety switch 59 has been closed by closure of the cabinet door of the timer, the operator desiring to start welding operations closes the control switch 54 which energizes relay 55 by low voltage current from the step-down transformer 60 which latter is energized from the power lines 61—62 over conductors 63—64 and 65—66. Relay 55 attracting its armature completes the energizing circuit of relay 56 supplied from conductors 65—66 which latter relay upon energization, completes the energizing circuit of the magnet 57 of the electromagnetic power switch 58 which energizing circuit may be traced from conductor 65, through contact 68, magnet 57, contact 69 to conductor 66. Energization of the magnet 57 closes the power switch 58 which connects the primary circuit of the welding transformer 2 to the power lines 61—62 by way of conductors 63—64, switch contacts 7—8 and conductors 5—6; and completes the actuating circuit of the step-by-step switch 27 at contact 70.

The primary winding of the welding transformer 2 being now connected to the power lines, the welding transformer through control of the timer operates to supply welding current impulses through the electrodes 1 over the welding circuit 3—4. During each welding impulse a control impulse is sent over the conductors 12—13 energizing the stepping magnet 28 to actuate the stepping pawl 29 which upon each back stroke steps the wiper arms of the switch 27 around from one contact to the next. The energizing circuit of the magnet 28 may be traced from conductor 12, through rectifier 31, conductor 71, magnet 28, conductor 72, rectifier 31, conductor 73 and the switch contact 70 back over conductor 13.

While the system is thus operating, with the wiper arm 31 sweeping over the dead or unconnected contacts such as 74, the meter 17, tape feeding magnet 26 and the relays 40, 46, 47 and 44, are in the normal position shown. Upon arrival of the wiper arm 31 at the first of the group of contacts 35, the tape feeding magnet 26 is energized to step the record tape, while at the same time the under-weld signal relay 40 is also energized. The energizing circuit of magnet 26 may be traced from power line 61 through conductor 63, contact 7, conductor 75, terminal 34, brush 33, wiper arm 31, contacts 35, conductors 76, 38, terminal 39, magnet 26, terminal 77, switch 78, terminal 79, conductor 80, contact 8, conductor 64, back over power line 62. The energizing circuit of relay 40 may be traced from power line 61 to terminal 39 as above traced and then through back contact 81, winding of relay 40, conductors 82, 83 and 84 to terminal 77 and thence to power line 62 as before traced. The relay 40 upon energization opens its initial energizing circuit at back contact 81 but immediately closes a locking circuit for itself through its front contact 85 and a back contact of release relay 46 which locking circuit may be traced from power line 61 to terminal 34 as previously traced and thence over conductor 86, 87, terminal 88, conductor 89 back contact of release relay 46, contact 85 of relay 40, winding of relay 40, thence to conductor 82 to power line 62 as previously traced. Energization of relay 40 also completes the circuit of the audible signal 49 which may be traced from power line 61 to terminal 88 as previously traced and thence over conductor 90, contact 52 of relay 40, conductors 51, 50, signal 49, conductor 84, terminal 77 and thence to power line 62 as previously traced.

To insure ample time for the operations just described a suitable plurality of contacts are included in the group 35. After the wiper arm 31 leaves the last of the group of contacts 35 the relay 40 remains locked in its energized position, so that the signal 49 also remains energized. However, the signal 49 gives little or no response before the wiper arm 31 engages the contact 41. Upon engagement of the wiper arm with the contact 41, the circuit of the meter-control relay 44 is closed, which circuit may be traced from power line 61 to wiper arm 31 as before traced and thence through contact 41, conductor 91, conductor 43, winding of relay 44, conductor 84, terminal 77 and thence to power conductor 62 as previously traced. Relay 44 upon energization opens its back contact 45 removing the shunt from across the terminals of the series transformer 14 permitting the full output of such transformer to pass to the meter 17 over conductors 15—16.

The operation of the various parts are so timed in relation to each other that the wiper arm 31 stepping between welding impulses arrives at the contact 41 before the beginning of the next welding impulse and remains thereon until the next interval between impulses when it steps off the contact permitting relay 44 to again close the shunt, with the result that the shunt circuit through contact 45 of the relay 44 is opened before the beginning of a welding impulse and remains open during the entire impulse period, closing after the impulse has ceased and before the beginning of the succeeding impulse. Thus the entire energy of a single welding-current impulse is measured by the meter 17.

The meter 17 receiving the output of the series transformer 14 responds thereto by a swing of the contact 19 to the left in proportion to the welding heat units or current-time value of the welding-current impulse. If this value is sufficient to represent the predetermined standard of weld perfection within a given permissible margin, the swing of the contact 19 will be sufficient to reach or pass over the contact 20 but will not reach the contact 21. Engagement of contacts 19 and 20, energizes release relay 46 over a circuit which may be traced from power line 61, to terminal 34 as previously traced, thence over conductor 86, contacts 19—20, conductor 92, relay 46, 83, 84 to terminal 77 and back to power line 62 as previously traced. The release relay 46 attracting its armature opens the back contact thereof, thus opening the locking circuit of the under-weld signaling relay 40 which latter releasing its armature opens the circuit of signal 49 at contact 52. As the groups of contacts 35 and 36 are connected in multiple and contacts 41 and 42 are connected in multiple, the above testing operation is repeated each time one of the wiper arms 31 or 32 sweeps over one of the sets of contacts 35—41 or 36—42, so long as the welding operations are proceeding. These testing operations are repeated at a frequency determined by the angular spacing between similar test control contacts on the switch 27, for example, contacts 42 and 41. Preferably the switch is so arranged that the intervals will be amply sufficient to give the meter 17 time to give a complete response at each test and return to normal before the next test, at the same time repeating the tests at a frequency sufficient to avoid undue repitition of any faulty operations.

As the welding operations continue, should faulty operation occur, in the nature of under welding, engagement of a wiper arm of the switch 27, say wiper arm 32, with the first contact of one of the sets of test contacts say the first contact of group 36, the under-weld signal relay 40 is energized locking itself up through the back contact of release relay 46 and energizing the audible signal all as above described. The wiper arm now engaging contact 42 effects the energization of meter control relay 44 whereupon the entire output of the series transformer 14 is directed through the meter 17 which this time because of the reduced output of the series transformer does not swing the contact 19 a sufficient angular distance to reach the contact 20. Thus the release relay 46 is not energized to release the locking circuit of signal relay 40, with the result that the audible signal 49 continuing energized apprises the operator of the faulty operation of the welding apparatus. At the end of the welding-current impulse just measured, and during the interval between it and the next impulse, the wiper arm 32 moves out of engagement with the contact 42 which opens the circuit of the relay 44 again shunting off the series transformer 14 from the meter 17. However, the energizing circuit of signal 49 remains closed until the operator, having stopped the welding operation, opens the switch 78 which as will be remembered is included in and therefore controls the locking circuit of relay 40, whereupon relay 40 is deenergized as is also the signal 49. After suitable adjustment or repair necessary to correct the fault causing such warning signal the switch 78 is again closed and welding operations continued.

Should the faulty operation be that of a burning or overheating, the meter 17 receiving the corresponding increased output from the transformer 14 will respond by a swing of the contact 19 to or beyond the contact 21. Contact 19 passing over contact 20 effects an actuation of release relay 46 releasing the alarm circiut but upon reaching contact 21 immediately thereafter, completes the energizing circuit of the over-weld signal relay 47. This circuit may be traced from power line 61 to contact 19 as previously traced and thence through contact 21, conductor 93, relay 47, conductors 83, 84 to terminal 77 and thence to power line 62 as previously traced. Relay 47 attracting its armature closes the circuit of signal 49 at contact 51 and closes a locking circuit for itself through contact 48. The circuit of signal 49 may be traced from power line 61 to terminal 88 as previously traced and thence over 94, 51, 50, 49, 84 to terminal 77 and to power line 62 as before traced. The locking circuit of relay 47 may be traced from power line 61 to terminal 88 as before and thence over 94, 48, 47, 83, 84 to terminal 77 and to power line 62 as before. As the relay 47 now controlling the signal circuit is locked up, the signal 49 continues to sound after the meter 17 has assumed normal position. The operator noting the continued sounding of the signal, stops the welding operation and releases the signal circuit by opening switch 78 which opens that portion of the circuit of relay 47 traced from relay 47 through 83, 84, 77 and 78.

It will be understood from the above, that any means equivalent in function may be substituted for the relay 44 and step-by-step switch 27, and that such means may be arranged to effect the recurring tests at any frequency of recurrence providing the intervals are sufficient to permit full restoration of the meter and its associated circuits and apparatus to normal and quiescent condition between testing periods. For example, an extra bank of contacts and cooperating set of wiper arms on the step-by-step switch 27 may take the place of the relay 44, and obviously where a mechanical timer is used, a mechanical switching element or elements properly synchronized with respect to the welding-current impulses may replace the step-by-step switch and relay 44. Also, a visual or other form of signal may be used instead of or together with the audible signal, and different signals may be used to indicate the different conditions respectively. Obviously, the relays 40 and 47 may be arranged to control different signals.

While a preferred, specific embodiment of the invention is herein shown and described in detail for the purpose of disclosure, it is to be understood that the invention is not limited to such specific embodiment but contemplates all such modifications and variants thereof as fall fairly within the scope of the appended claims.

What I claim is:

1. In a high speed spot welding system operable to produce spot welds in rapid succession, a welding circuit, a welding heat units indicator and means driven in timed relation with the succession of spot welding operations for intermittently, operatively connecting the indicator to the welding circuit, each time during and contemporaneously with one complete individual welding period excluding one or more preceding and succeeding welding periods.

2. In a welding system operable to produce spot welds in rapid succession, a welding circuit, means for producing successive impulses of welding current in said circuit, a welding heat units indicator, and means driven in timed relation with the succession of spot welding operations for intermittently, operatively connecting the indicator to the welding circuit for periods including and contemporaneous with one complete welding current impulse and excluding one or more preceding and succeeding impulses.

3. In a welding system operable to produce spot welds in rapid succession, a welding circuit, means for producing successive impulses of welding current in said circuit, a welding heat units indicator, and means driven in timed relation with the succession of spot welding operations for intermittently, operatively connecting the indicator, during a succession of impulses, to the welding circuit for periods each including and contemporaneous with one welding impulse only.

4. In a welding system operable to produce spot welds in rapid succession, a welding circuit, means for producing successive impulses of welding current in said circuit, a welding heat units indicator, and means operated in timed relation with the succession of current impulses for operatively connecting said indicator, during a succession of impulses, with the welding circuit during and contemporaneously with one complete welding current impulse only.

5. In a welding system operable to produce spot welds in rapid succession, a welding circuit, means for producing successive impulses of welding current in said circuit, measuring means having a time lag in excess of the interval between impulses, and means for operatively connecting said measuring means, during a succession of impulses, with said circuit during and contemporaneously with a period including one welding impulse only.

6. In a welding system operable to produce spot welds in rapid succession, a welding circuit, means for producing successive impulses of welding current in said circuit, measuring means for measuring the current-time product of said welding impulses and having a cycle period longer than the interval between said successive impulses, and circuit control means operating in synchronism with said impulses for operatively connecting said measuring means, during a succession of impulses, with said circuit during and contemporaneously with a period including one welding impulse only for measuring that impulse.

7. In a welding system operable to produce spot welds in rapid succession, a welding circuit, means for producing successive impulses of welding current in said circuit, measuring means for measuring the current-time product of said welding impulses and having a cycle period longer than the interval between said successive impulses, and circuit control means operating in synchronism with said impulses for operatively associating said measuring means, during a succession of impulses, with said circuit during and contemporaneously with a period including one welding impulse only for measuring that impulse.

8. In a welding system operable to produce spot welds in rapid succession, a welding circuit, means for producing successive impulses of welding current in said circuit, measuring means normally operatively disconnected from said circuit, means for operatively connecting said measuring means with the welding circuit during a period including and contemporaneous with one welding impulse only, and signaling means, said connecting means being arranged to effect energization of said signaling means in advance of the connection of the measuring means and means operated by the measuring means to deenergize the signaling means upon attainment of a given measured value.

9. In a welding system operable to produce spot welds in rapid succession, a welding circuit, means for producing successive impulses of welding current in said circuit, measuring means normally operatively disconnected from said circuit, means for operatively connecting said measuring means with the welding circuit during a period including and contemporaneous with one welding impulse only, signaling means, first and second locking relays each arranged upon energization to effect energization of said signaling means, and a control relay arranged upon energization to open the locking circuit of said first locking relay, said connecting means being arranged to close the circuit of said first locking relay in advance of the connection of said measuring means, and means operated by the measuring means to effect a deenergization of said control relay upon the attainment of a given measured value and to effect energization of said second locking relay upon the attainment of a higher measured value.

10. In a welding system operable to produce spot welds in rapid succession, a welding circuit, means for producing successive impulses of welding current in said circuit, measuring means for measuring the current-time product of said welding impulses normally operatively disconnected from said circuit, means for operatively connecting said measuring means with the welding circuit during a period including and contemporaneous with one welding impulse only, and signaling means, said connecting means being arranged to effect energization of said signaling means in advance of the connection of the measuring means and means operated by the measuring means to effect continuation of the energization of said signaling means in accordance with the measured value.

11. In a welding system utilizing a welding circuit to which welding current is supplied in rapidly recurring impulses for producing successive welds, the combination of a welding-heat units indicator limited in the time required for a complete operation to a period greater than the lapse of time between said current impulses, and means for operatively connecting said indicator to the welding circuit during and contemporaneously with one complete individual welding current impulse, excluding one or more preceding and succeeding welding current impulses.

12. In a welding system utilizing a welding circuit to which welding current is supplied in rapidly recurring impulses for producing successive welds, the combination of an integrating welding-heat units indicator limited in the time required for a complete operation to a period greater than the lapse of time between said current impulses, and means responsive to the welding current impulses for operatively connecting the said indicator to the welding circuit during and contemporaneously with one complete individual welding impulse, excluding one or more preceding and succeeding impulses.

13. In a welding system utilizing a welding circuit to which welding current is supplied in rapidly recurring impulses for producing successive welds, the combination of a welding-heat units indicator requiring for its full response a period greater than a lapse of time between said current impulse and a timing switch operated in response to said welding current impulses for operatively connecting the said indicator to the welding circuit during and contemporaneously with one complete individual welding impulse, excluding one or more preceding and succeeding impulses.

14. In a welding system, a welding circuit, means for producing successive impulses of welding current in said circuit, indicating means, switching means for operatively connecting said indicating means to the welding circuit during and contemporaneously with one complete individual welding impulse, and timing means for said switching means controlled by said impulses for operation in timed relation to said impulses.

15. In a welding system, a welding circuit, means for producing successive impulses of welding current in said circuit, indicating means, switching means for operatively connecting said indicating means to the welding circuit, means for operating said switching means in response to said impulses, and means for rendering said operation effective to connect the indicating means to the circuit during and contemporaneously with one complete cycle separated by one or more preceding cycles and one or more succeeding cycles.

CHARLES E. HEITMAN, Jr.